(12) United States Patent
Buchholz et al.

(10) Patent No.: US 8,601,551 B2
(45) Date of Patent: Dec. 3, 2013

(54) SYSTEM AND METHOD FOR A BUSINESS DATA PROVISIONING FOR A PRE-EMPTIVE SECURITY AUDIT

(75) Inventors: Cristina Buchholz, Reilingen (DE); Bare Said, St. Leon (DE)

(73) Assignee: SAP AG, Walldorf (DE)

( * ) Notice: Subject to any disclaimer, the term of this patent is extended or adjusted under 35 U.S.C. 154(b) by 140 days.

(21) Appl. No.: 12/978,797

(22) Filed: Dec. 27, 2010

(65) Prior Publication Data

US 2012/0167200 A1 Jun. 28, 2012

(51) Int. Cl.
*G06F 21/00* (2013.01)

(52) U.S. Cl.
USPC .................................................. 726/4; 726/17

(58) Field of Classification Search
USPC ........................................................ 726/17, 4
See application file for complete search history.

(56) References Cited

U.S. PATENT DOCUMENTS

| 7,503,062 | B2 * | 3/2009 | Wong et al. ........................ 726/2 |
| 7,703,033 | B2 * | 4/2010 | Buchholz ....................... 715/771 |
| 2005/0288965 | A1 * | 12/2005 | Van Eaton et al. ................ 705/2 |
| 2007/0255715 | A1 * | 11/2007 | Li et al. ............................ 707/10 |
| 2009/0063490 | A1 * | 3/2009 | Fuerst et al. ....................... 707/9 |
| 2011/0154433 | A1 * | 6/2011 | Karabulut .......................... 726/1 |
| 2011/0161342 | A1 * | 6/2011 | Boskamp et al. .............. 707/769 |

* cited by examiner

*Primary Examiner* — Kambiz Zand
*Assistant Examiner* — Ghodrat Jamshidi
(74) *Attorney, Agent, or Firm* — Kenyon & Kenyon LLP

(57) ABSTRACT

Embodiments of the present invention may provide a system and method for business data provisioning for a pre-emptive security audit. In one aspect, a method embodiment may comprise the steps of identifying the business resources as expressed in business terms, ensuring that applications dealing with (parts of) the business resources are aware of the link to the resource, transmitting the information about the used business resources throughout the call stack up to the UI, making use of the highest access enforcement point possible where it can be ensured that access to the protected resource is only done through either authorized users or trusted code, and having this access enforcement point taken over by a framework to ensure adequate protection even in extensibility scenarios.

24 Claims, 13 Drawing Sheets

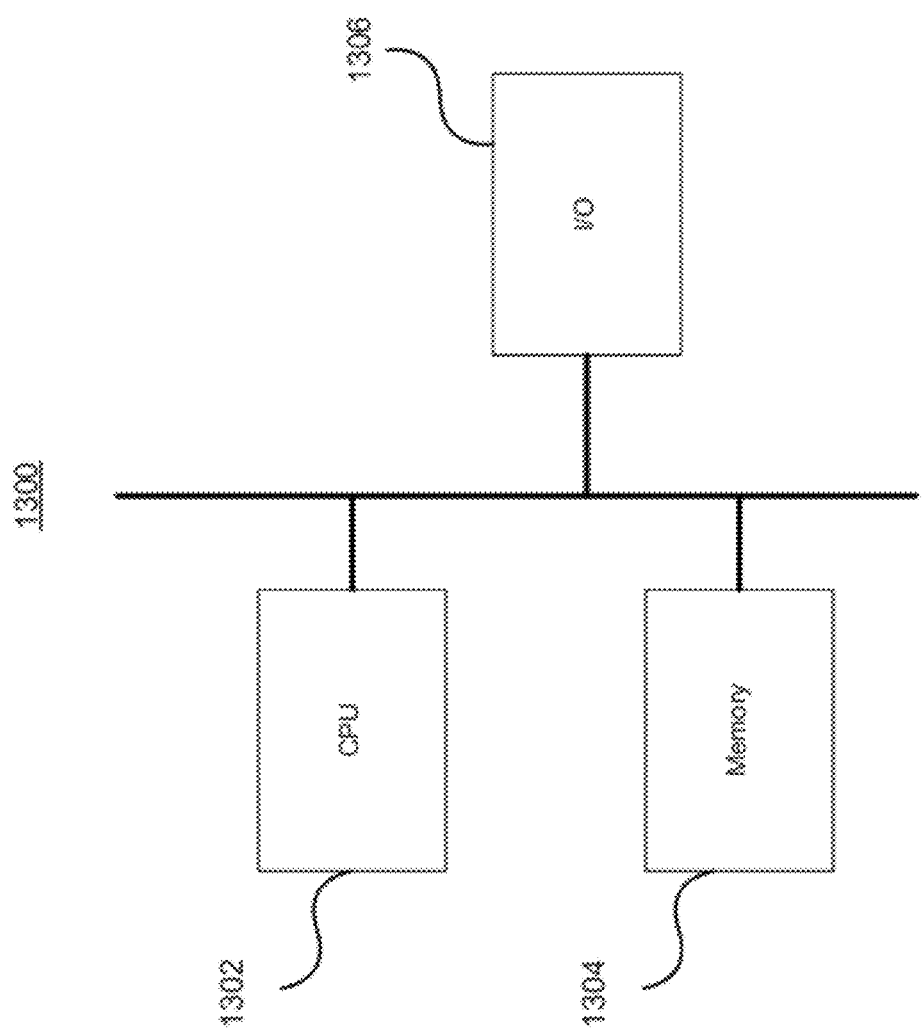

SYSTEM AND METHOD FOR A BUSINESS DATA PROVISIONING FOR A PRE-EMPTIVE SECURITY AUDIT

FIELD

The disclosed subject matter relates to the field of computer systems and, more particularly, to a system and method for business data provisioning for a pre-emptive security audit.

BACKGROUND

Computer security is imperative in this information age. Protecting sensitive computer data from unauthorized access is one of the most important and daunting tasks faced by computer experts, businesses and government agencies. One way of protection is checking access to a specific application area. For example, checking access to a table, a form, a web resource or a business transaction. Existing systems sometimes provide a framework to govern the access to the application while the frame has no knowledge about the protected application, its sensitivity or business relevance. Another way of protection is implementing security controls in applications to require a user to possess certain authorizations to access data (e.g., the user is required to be in a certain role or has a specific authorization object.

However, not all applications in a computer system are protected and the level of protection of different applications are different. In particular, custom built applications need to follow the same steps in order to ensure an adequate level of protection. But the development process is mostly tedious and not always documented. Further, there is a gap between the authorization enforcement point and the business resource to be protected. While this link is missing, there is also no way to link the enforced authorizations with the users' responsibilities. In essence, it is impossible to technically verify that the actions performed by a user are in correspondence to the user's business responsibilities. Another consequence is that it is not possible to reliably determine the minimal authorizations that are to be assigned to a user, in order for this user to perform a specific business function.

Moreover, nested applications (layers of applications) brings further complications. In one approach for the nested application, the authorizations are enforced only on the entry level of the application; the consequence is that the knowledge about the resources accessed in the deeper level of the nested applications is lost. In another approach, the authorizations are enforced in all levels of the nested application; in this case the user needs extensive authorizations, which both make administration tedious and endanger the system security, because the user might directly access resources that should only be modified as reaction to the change of another resource (e.g., the application log or change documents).

Traditional computer security audit does not help to link the authorization enforcement point and the business resource to be protected. A computer security audit has been the traditional way to assess adequacy of security protections of a system or application. The security audit can be manual or automated. The manual assessments often include interviewing staff, performing security vulnerability scans, reviewing application and operating system access controls, and analyzing physical access to the systems. The automated assessments, or Computer Assisted Auditing Techniques (CAAT), often include system generated audit reports or using software to monitor and report changes to files and settings on computer systems (e.g. personal computers, servers, mainframes, network routers, switches) or software applications (e.g., web services, database servers).

One way of a security audit is implemented by an extensive analysis of the various log files reflecting the access history to a system. In fact, provided there is any central authorization enforcement authority in the system, the easiest way to generate a security relevant trace is to record all authorization decisions undertaken by this central authority. But this approach is backward oriented, and can give only limited information about the potential risk state of the system. The fact that no business data misuse has taken place does not necessarily mean that this is not possible in a given system or application setup. This approach cannot mitigate the gap between the authorization enforcement point and the business resource to be protected.

Another approach of security audit is to systematically assess the organization's security policy and of the way it is applied at a specific site. However, using this approach, security auditors typically require full knowledge of the organizational structure, of the processes employed and of the resources to be protected. Often, considerable inside information is required in order to understand the processes involved in accessing the business data. Further, auditors and systems speak different languages. The auditors have a thorough understanding of the resources to be protected. This understanding is expressed in business terms, like general ledger, financial account, and customer data. The exigencies of efficient data storage and access lead to this data never being directly and entirely mapped to some dedicated identifiable database element. On the other side, identifying the access paths to this data is required in order to be able to judge its efficient protection during an audit. Given the dynamic nature of computer configurations and information storage, this means that the auditor must keep up with the internal makings of every audited application, just in order to identify the paths for accessing the resource. Although an audit can verify that each user is assigned to authorizations commensurate with their job responsibilities, it is difficult to decide which authorizations are required for performing a job. This approach cannot mitigate the gap between the authorization enforcement point and the business resource to be protected, either.

Therefore, there is a need for a system and method that provides a mechanism to translate the business data to assignable authorizations.

BRIEF DESCRIPTION OF THE DRAWINGS

FIG. 13 illustrates a computer server according to an exemplary embodiment of the present invention.

DETAILED DESCRIPTION

Embodiments of the present invention may provide a system and method for business data provisioning for a pre-emptive security audit. In one aspect, a method embodiment may comprise the steps of identifying the business resources as expressed in business terms, ensuring that applications dealing with (parts of) the business resources are aware of the link to the resource, transmitting the information about the used business resources throughout the call stack up to the UI, making use of the highest access enforcement point possible where it can be ensured that access to the protected resource is only done through either authorized users or trusted code, and having this access enforcement point taken over by a framework to ensure adequate protection even in extensibility scenarios.

Embodiments of the present invention may use role based access management (RBAM) as authorization enforcement tool, and controllers for facilitating access to heterogeneous data and preparing the data for UI output. Further, a metadata repository as repository for all UI and business related data may be used. The embodiments may address the questions of what authorizations users with a specific business function have and what controls are in place to enforce that users can only act according to these authorizations.

Figure 1:
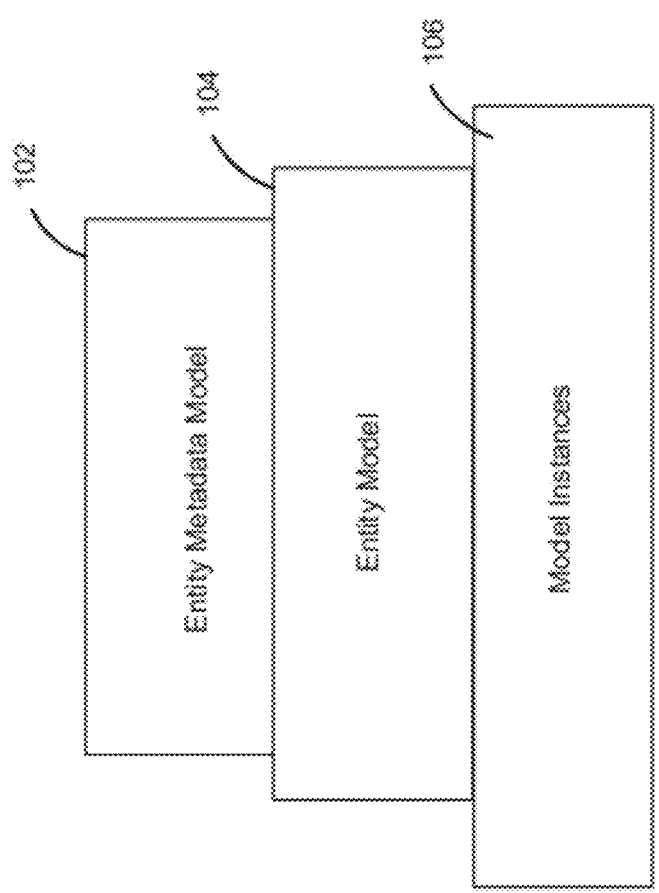
FIG. 1 illustrates metadata object modeling according to an exemplary embodiment of the present invention.

FIG. 1 illustrates a metadata object modeling hierarchy 100 according to an exemplary embodiment of the present invention. The metadata object modeling hierarchy 100 may comprise an entity metadata model 102, an entity model 104 and model instances 106. The entity metadata model 102 may have nodes and associations with respect to other entities and may represent a model for any entities in a system. The entities may be modeled include, but not limited to the following: business object (BO) entity, Data type, Process Agent, Message Type, Service Interface, Enterprise Service Interaction, UI Text, UI Application, Workcenter, Workcenter View, Floorplan. The entity model 104 may represent a particular entity (e.g., a particular BO). The model instances 106 may represent instances of a particular entity (e.g., an instance of a particular BO).

In one embodiment, the models according to the metadata object modeling hierarchy 100 may be referred to as metadata object models or MOs. Developers use the modeled MOs in the backend in order to create actual MO instances as required. The metadata object modeling may be based on extended semantic realism (ESR) modeling and the MOs are modeled using the ESR modeling environment. In one embodiment, the MOs maybe created by correspondence to the business objects. For example, the entity metadata model 102 may correspond to BO metadata model, the entity model 104 may correspond to BOs, and the model instances 106 may correspond to BO instances.

Figure 2:
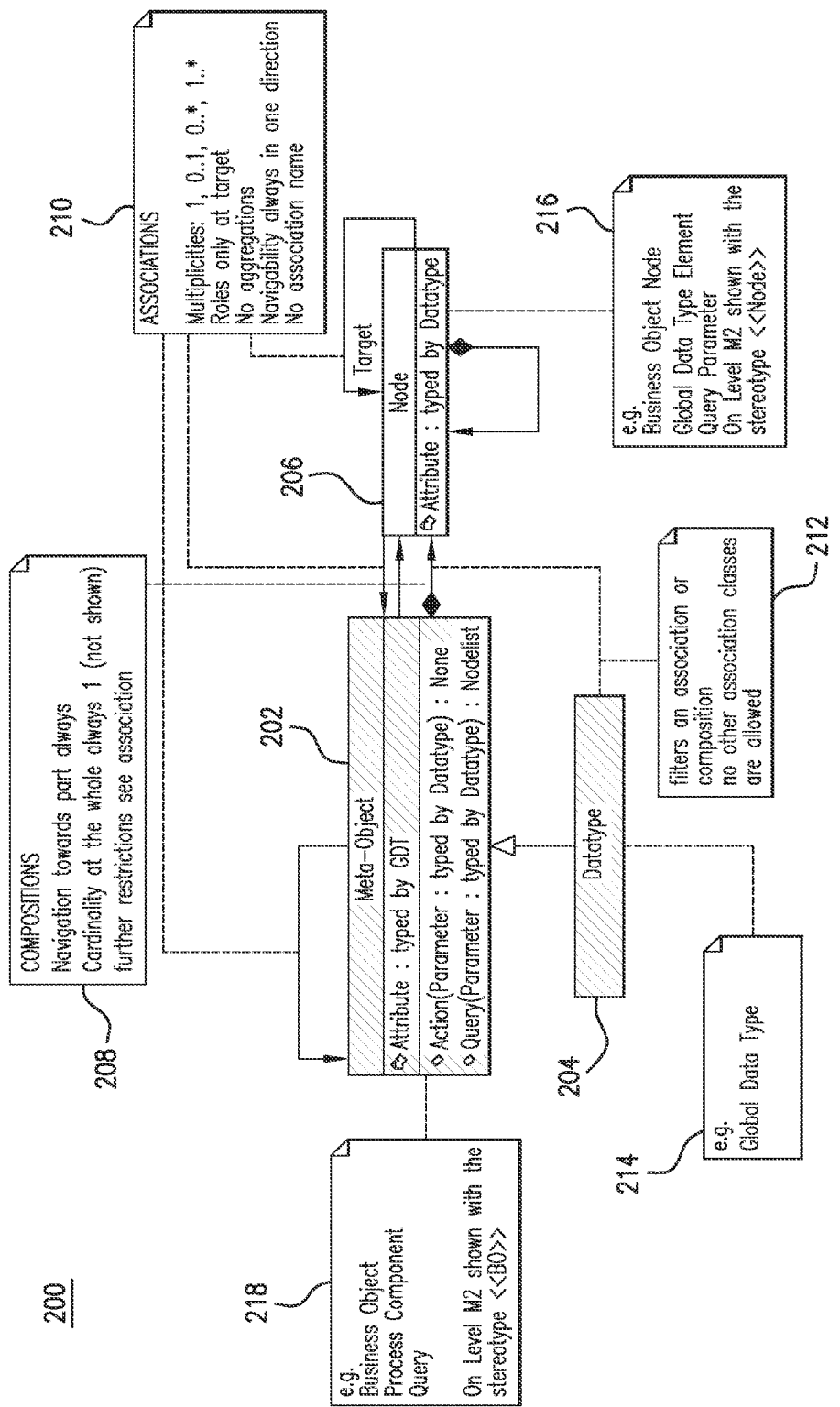
FIG. 2 illustrates an abstract model of a metadata object entity according to an exemplary embodiment of the present invention.

FIG. 2 illustrates an abstract model 200 of a metadata object entity according to an exemplary embodiment of the present invention. The abstract model 200 may depict a meta-object 202 with a datatype tag 204 and having a node 206. The meta-object 202 may be a BO, process component, or query as shown in the tag 218. The datatype tag 204 be specified by a tag 214 to be "Global Data Type." The link from the meta-object 202 to the node 206 may be represent a composition relationship as shown in a compositions tag 208. The link from the node 206 to the meta-object 202 may represent an association relationship as shown in an associations tag 210. The specific data type of the meta-object 202 may be used to filter the association or composition between the meta-object 202 and the node 206 ash shown by the tag 212. The node 206 may be a BO node or a global data type element query parameter as shown in the tag 216.

In one embodiment, the metadata object models depicted in FIGS. 1 and 2 may have the following characteristics. The nodes, composite associations, associations, elements structure, attribute properties may be elements of entity modeling language and not specific elements of business object meta model. Further, cross associations may be used to define intra-entity-relationships (e.g. BO<->process component). Moreover, business object processing framework (BOPF) may be used to implement the defined solution-entity models (like BO implementation). For example, BOPF may provide manage model instance persistency and lifecycle management, implement model consistency constrains, generate persistency tables that are client-dependent in order to support multi-client capability.

The modeling of metadata in a backend application (e.g., an Advanced Business Application Programming (ABAP) backend application server) may ensure consistency between design time and runtime metadata artifacts, independent of the usage paradigm. A metadata repository may be used to ensure transparency of logical dependency between models by comprehensive modeling of all metadata and their relationships. The declared dependencies can be used by lifecycle tools (Transport and change management, versioning). The repository may provide uniform read/write APIs for all metadata and common modeling tools, thereby greatly reducing the modeling turn-around time.

Figure 3:
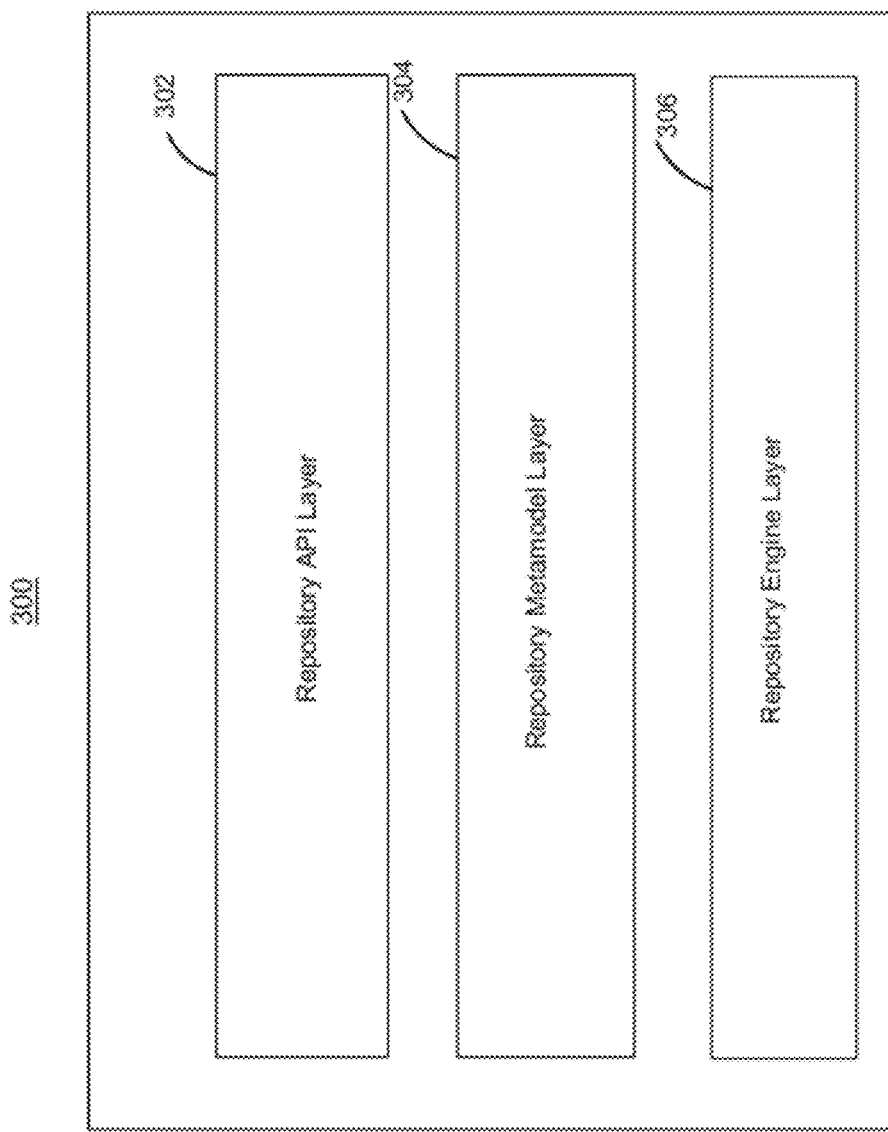
FIG. 3 illustrates a metadata repository according to an exemplary embodiment of the present invention.

FIG. 3 illustrates a metadata repository 300 according to an exemplary embodiment of the present invention. The metadata repository may provide the concept, technology and storage for modeling all entities required for modeling business scenarios from start to finish using one and the same modeling infrastructure. The metadata repository 300 may comprise a repository API layer 302, a metadata model layer 304 and a repository engine layer 306. The metadata model layer 304 may store the metadata object models. The repository API layer 302 may comprise repository services that can be invoked by other applications or services to access the metadata repository. The repository engine layer 306 may comprise low level services, for example, to store, transport, administrate and process the instances of the metamodels. The metadata model layer may comprise services to define and implement metamodels, that can be used to represent development entities like business object or workcenter, etc. In one embodiment, the repository API layer 302 and repository engine layer 306 may be layers of standard repositories.

In one embodiment, the metadata repository 300 may have a multi-tenant enabled flexibility. The BO meta model in ESR may be enhanced with special associations called "extended by" and "extension of." Both associations may be used by Enterprise Service Framework (Business object runtime engine) in order to support the multi-tenant enabled flexibility of the metadata repository 300.

Figure 4:
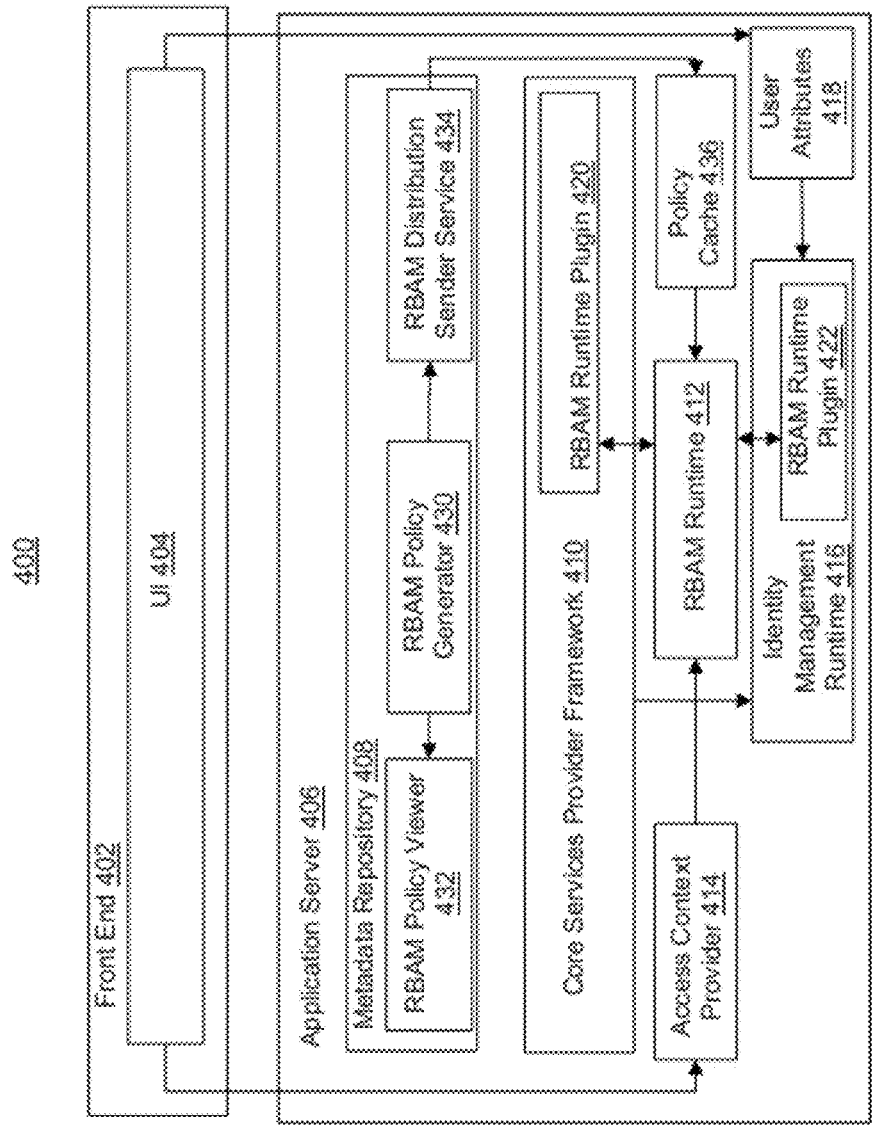
FIG. 4 illustrates a role based access management architecture according to an exemplary embodiment of the present invention.

FIG. 4 illustrates a role based access management (RBAM) architecture 400 according to an exemplary embodiment of the present invention. The RBAM architecture 400 may comprise a front end 402, which may include a user interface (UI) 404. The front end 402 may be on top of an application server 406. The application server 406 may include a metadata repository 408, a core services provider framework 410 and an RBAM runtime 412. In one embodiment, the front end 402 may be the front end of a user application and the application server 406 may implement framework support to the user application. For example, the core services provider framework 410 may be coupled to a BO or core service provider (not shown) that hosts BOs. The BOs may implement business logic and encapsulate business data.

The metadata repository 408 may include an RBAM policy generator 430, an RBAM policy viewer 432 and an RBAM distribution sender service 434. In one embodiment, the objects involved in any authorization process may be part of the metadata repository 408. The metadata objects may be the basis for the definition of functional authorization and the definitions of functional authorizations may be aggregated in RBAM policies. RBAM policy generator 430 may generate RBAM policies and send to the RBAM policy viewer 432 and RBAM distribution sender service 434. The RBAM distribution sender service 434 may send the RBAM policies to the policy cache 436. The RBAM policy generator 430 may keep track of which authorizations are relevant for which user role and may generate authorization data (e.g., RBAM rules) accordingly. The RBAM runtime 412 may use the policies cached in the policy cache 436 to determine access to BOs. The policy cache 436 may be a local, persistent cache for the RBAM runtime 412 store the authorization data (RBAM rules) received from the RBAM policy generator 430. The core services provider framework 410 may have an RBAM runtime plugin 420 coupled to the RBAM runtime 412 to facilitate this functionality. In one embodiment, the RBAM runtime 412 may also use an access context. The access context may be provided by the UI 404 via the access context provider 414 to the RBAM runtime 412.

In one embodiment, assignments of functional RBAM authorizations may be covered by the assignment of an RBAM policy to a business object identity. The UI 404 may send user attributes 418 to an RBAM runtime plug-in 422 hosted an identity management runtime 416. In order to improve visibility and usability, the user is assigned the business-relevant entities such as work center views or interaction roles, which then determine indirect assignment of matching RBAM policies.

The authorization-relevant meta objects may be of two types: entities relevant for authorization enforcement and entities relevant for authorization assignment. The entities relevant for authorization enforcement may include business object node, service interface, mass data run Object (MDRO), reports, query definition, UI application, task type. The entities relevant for authorization assignment work center, work center view and interaction role. For example, the "start" authorization may be implemented in a metadata object and checking of the metadata object may be performed by the RBAM runtime 412. In addition, the RBAM runtime 412 may check whether the user is allowed to retrieve the data accessed by the execution.

In one embodiment, the RBAM policy generator 430 may transform the resulting policies into the XML format for transport to the back end and sends them to the existing policy cache via the RBAM distribution sender service 434. The RBAM policy viewer 432 may create a readable version of the policy for every generator role or source entity.

In one embodiment, the RBAM architecture 400 may provide an authorization system that is internally based on rules. Rules may specify one or more conditions that must be met by the subject (e.g. John Smith), the operation (e.g. READ), and/or the resource (e.g. Sales Order 4711) involved in an access. If the actual runtime access matches the conditions specified in the rule, the runtime may make a decision according to the effect specified by the rule (grant or deny). The conditions in a rule may use context data of subject, operation and/or resource, and may use additional context data (environment) that is specific to neither of the three. Context data may be available to RBAM in terms of multi-valued attributes, which can be provided by plug-ins for the RBAM runtime. This way, RBAM does not impose any limits on which attributes can be relevant for authorization, and thereby ensures extensibility.

Figure 5:
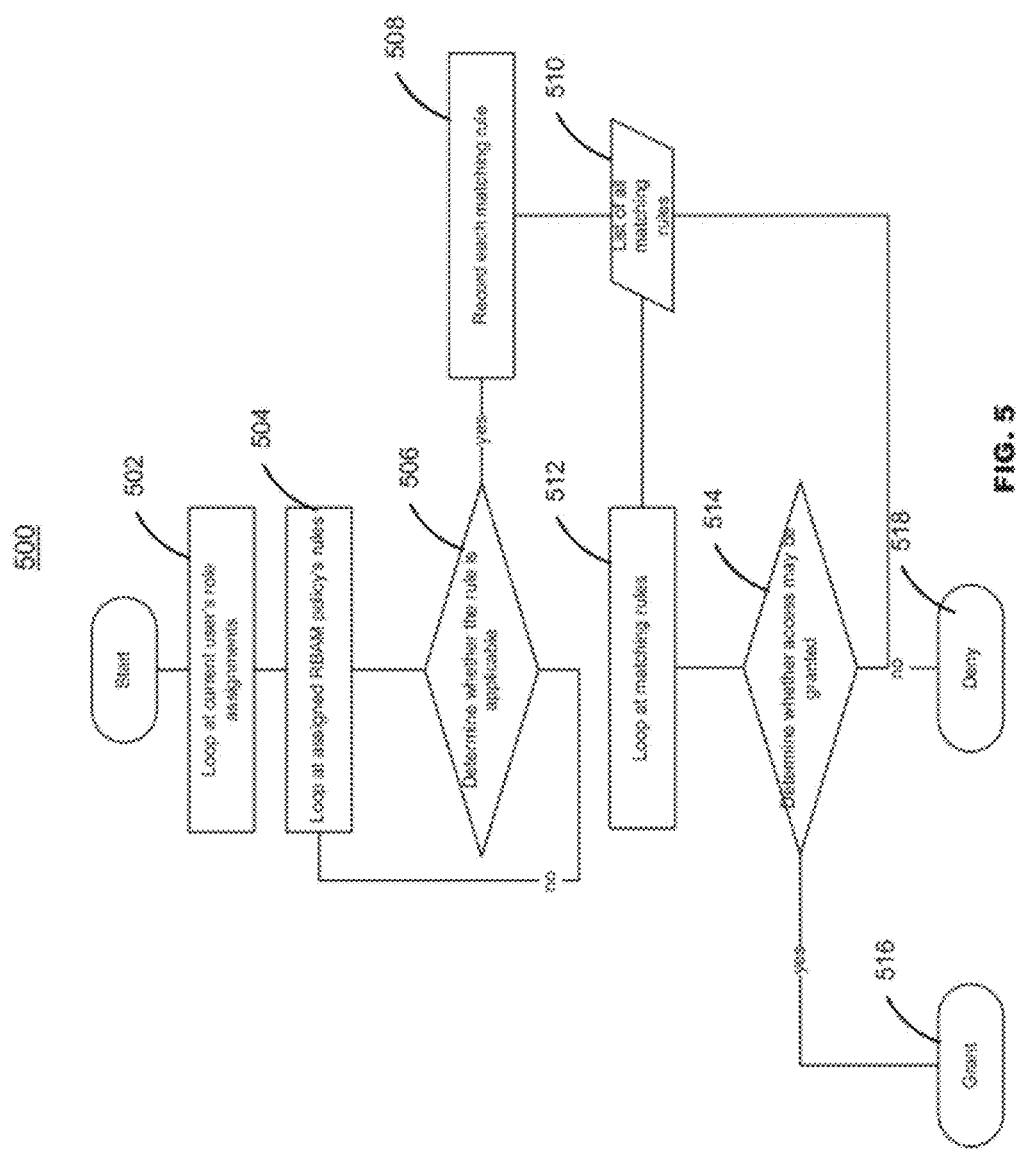
FIG. 5 illustrates a process to determine authorization according to an exemplary embodiment of the present invention.

FIG. 5 illustrates an authorization decision process 500 according to an exemplary embodiment of the present invention. The authorization decision process 500 may be used to check authorization based on a resource to be accessed (e.g., BO node instance) and an access (e.g., a READ or WRITE operation). The authorization decision process 500 may start at block 502 by looping through current user's role assignments. In RBAM, users may be assigned roles, thus, each role the current user has been assigned may be checked. Then, at block 504, the authorization decision process 500 may loop through assigned RBAM policy's rules. As described above, the authorization system may be based on rules. At decision block 506, the authorization decision process 500 may determine whether there is a rule is applicable. For example, a rule may be specified that protects the resource to be accessed, and the operation controlled in the rule may be the operation trying to perform. If yes, at block 508, the match rule may be stored in a list for matching rules (e.g., the block 510). If no, the authorization decision process 500 loops back to check next assigned RBAM policy's rule until all assigned RBAM policy's rules are checked. At block 512, the authorization decision process 500 may loop at the matching rules stored in the list of all matching rules 510. At block 514, the authorization decision process 500 may determine whether requested access may be granted. If yes, the access is granted in block 516 and the authorization decision process 500 may end. If no, the authorization decision process 500 may check next matching rule from the list of all matching rules 510 until all matching rules are checked. If no matching rule grant access, the requested access may be denied in block 518.

Figure 6:
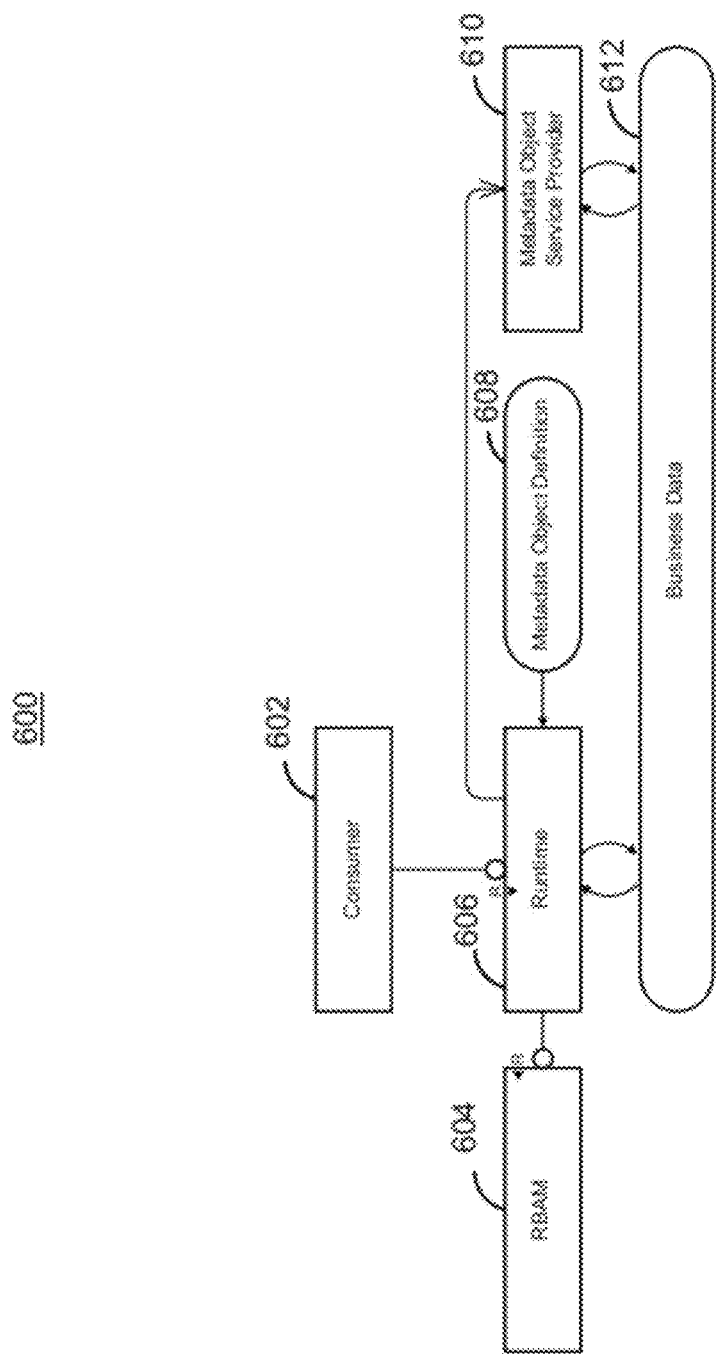
FIG. 6 illustrates access to objects through an runtime framework and invocation of RBAM to protect the accessed objects according to an exemplary embodiment of the present invention.

FIG. 6 illustrates access to objects through a corresponding runtime framework and how RBAM is invoked to protect the accessed object according to an exemplary embodiment of the present invention. A data consumer 602 may try to access business data 612 through a runtime framework 606. The runtime framework 606 may be an access runtime for a business resource, which need to be protected. The runtime framework 606 may invoke the RBAM 604 to protect the accessed objects. During RBAM invocation the runtime framework 606 may pass to the RBAM 604 the needed metadata belonging to the accessed object. The runtime framework 606 may be Enterprise Service Framework (ESF), which is the implementation framework for the Business Object Metamodel, or a UI Framework, or Process Agent framework. The Metadata Object Definition 608 may be the Metadata Object Business Object or Work Center or Web Service Interface In one embodiment, the runtime framework may be a component that operates locally in every system where authorization decisions need to be made (access management clients). The runtime may be used in different frameworks for examples (UI framework or Enterprise Service Framework) in order to realize an common authorization enforcement Point.

Figure 7:
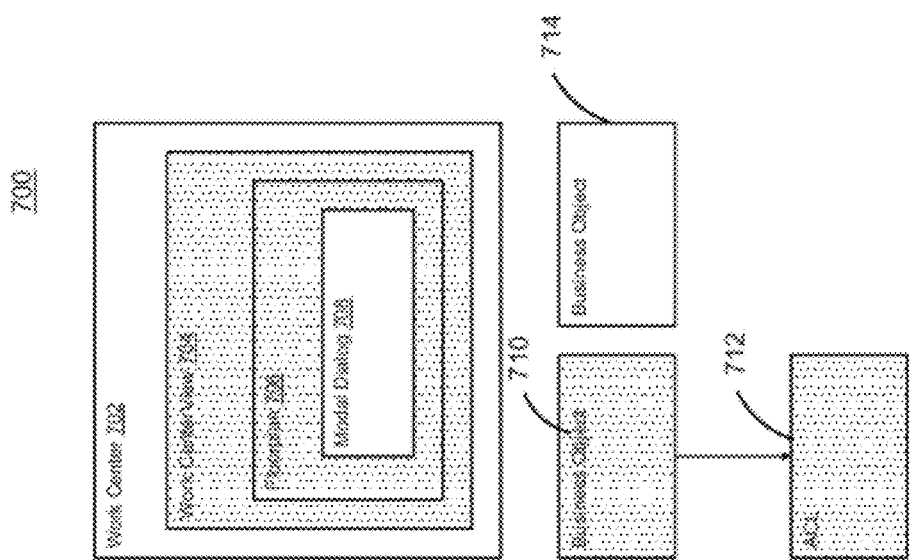
FIG. 7 illustrates access in user and privileged modes according to an exemplary embodiment of the present invention.

FIG. 7 illustrates different access modes according to an exemplary embodiment of the present invention. In one embodiment, the UI authorizations may follow a "UI comes first" design principle. That is, whenever an element of a UI is added to visualize business object data (service adaptation), this additional data may be made accessible to the user. From an authorization point of view, this means that no functional authorization errors may result from accessing additional data in this way. On the other hand, instance-based authorizations may be required for the business object instance which contains the primary data of the UI. As a result, the authorization for a UI may be expressed by the authorization to start the UI and the definition that instance-based authorizations for the primary business object may be in effect. In one embodiment, two access modes: user mode and privileged mode may be implemented. This may be implemented in an RBAM privileged mode. In one embodiment, if a requested access is made in an RBAM privileged mode, that once an RBAM authorization check is passed successfully, all subsequent calls will be granted. FIG. 7 shows a UI structure 700 according to an exemplary embodiment of the present invention.

The UI structure 700 may include a work center 702, a work centerview 704, a floorplan 706 and a modal dialog 708. Each of the work center 702, the work centerview 704, the floorplan 706 and the modal dialog 708 may represent a level of building blocks for a UI. A BO 714, which may be accessed from the work center 702 and the modal dialog 708, may be in a privileged mode. A BO (e.g., a BO 710), which may be accessed from the work centerview 704 and floorplan 706, may be in a user mode and access may be controlled by an access control list (ACL) 712.

Figure 8:
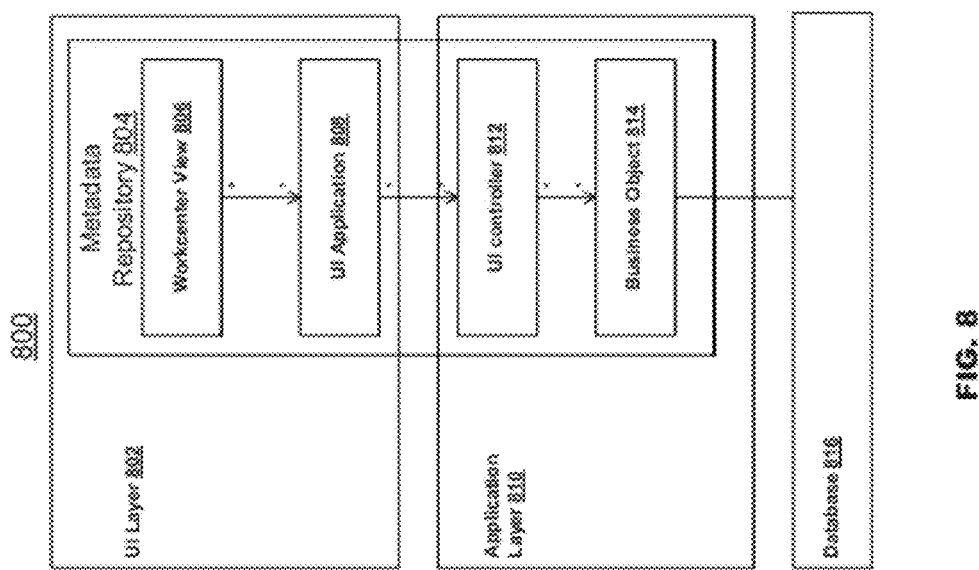
FIG. 8 illustrates layered access from user interface (UI) to business objects according to an exemplary embodiment of the present invention.

FIG. 8 illustrates a layered access model 800 from user interface (UI) to business objects according to an exemplary embodiment of the present invention. The layered access model 800 may comprise a UI layer 802, an application layer 810 and a database layer 816. A metadata repository 804 may cross the UI layer 802 and application layer 810.

In one embodiment, the business data is modelled as Business Objects (BO) (e.g., BO 814) in the metadata repository 804. The metadata model of the BOs may contain not only business data, but also information related to the type of access control that is to be applied on the BO. On top of the BO 814 may be the controllers in the UI controller 812. The controllers in the UI controller 812 may make use of potentially more than one business object in order to format the information in a way that is suitable for a specific process. Usually this may be the way it is used in a user interface (UI). The UI components, which are represented by the UI application 808, may make direct use of one or more controllers in order to display and maintain the data. The UI components in the UI application 808 may be display units in a workcenter view 806.

In one embodiment, objects of the type business object may represent the business data that is to be protected. This may be ensured through an exigent modelling process of the BOs. In this embodiment, the business objects accessed by a particular UI may be collected through evaluation of the usage links present in the metadata repository 804 between the respective objects. The usage of a business object through a higher placed entity may also give the information about the action performed on the business object (e.g., whether the access is for reading or modifying the business data). On top of the evaluation of the usage links to the business objects, qualifiers may be placed on the usage link to designate specific links to be not relevant for a specific usage (e.g., only used to retrieve text data for a given identifier).

Figure 9:
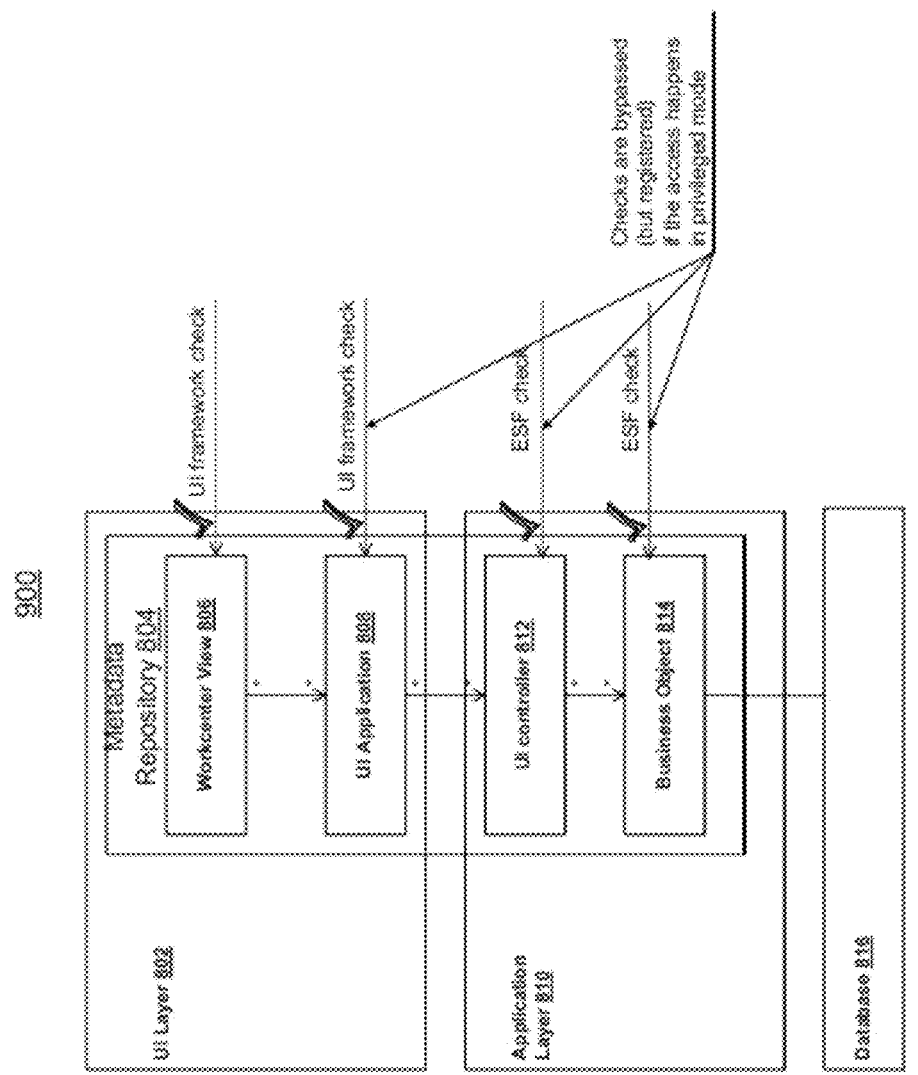
FIG. 9 illustrates access enforcement points for layered access according to an exemplary embodiment of the present invention.

FIG. 9 illustrates access enforcement points for the layered access model 800 according to an exemplary embodiment of the present invention. As shown in FIG. 9, access enforcement points may be at each layer in the call stack. depending on the accessed objects and their meta data models defined in the metadata repository 804. At the workcenter view 806 and UI application 808 layers, the access checks may be performed by UI framework. At the UI controller 812 and BO 814 layers, the access checks may be performed by enterprise service framework (ESF). In one embodiment, if a requested access happens in a privileged mode at the workcenter view 806, the UI framework check at the UI application 808, and ESF check at the UI controller 812 and BO 814 may be bypassed while the requested access may be registered for audit purpose.

In one embodiment, the access enforcement points may be placed at the highest possible level in the call stack where it can be ensured that the access to the protected resources, the BOs, is either done through authorized users or by trusted code. The access enforcement points may be placed only in the frameworks, ensuring that even code which is created in an extensibility scenario outside of a regulated development environment benefits of the same level of protection. Also, only the frameworks may be able to change the level of the access enforcement check from user-mode to privileged-mode, following a successful check. The essential point for the audit scope however, is that the access enforcement may be done at the level of each defined object of the metadata repository 804. The access to a specific object type may be governed by their respective framework. Following the usage links described above, what business resources have been part of the access at the level of each technical authorization enforcement check may be decided.

Figure 10:
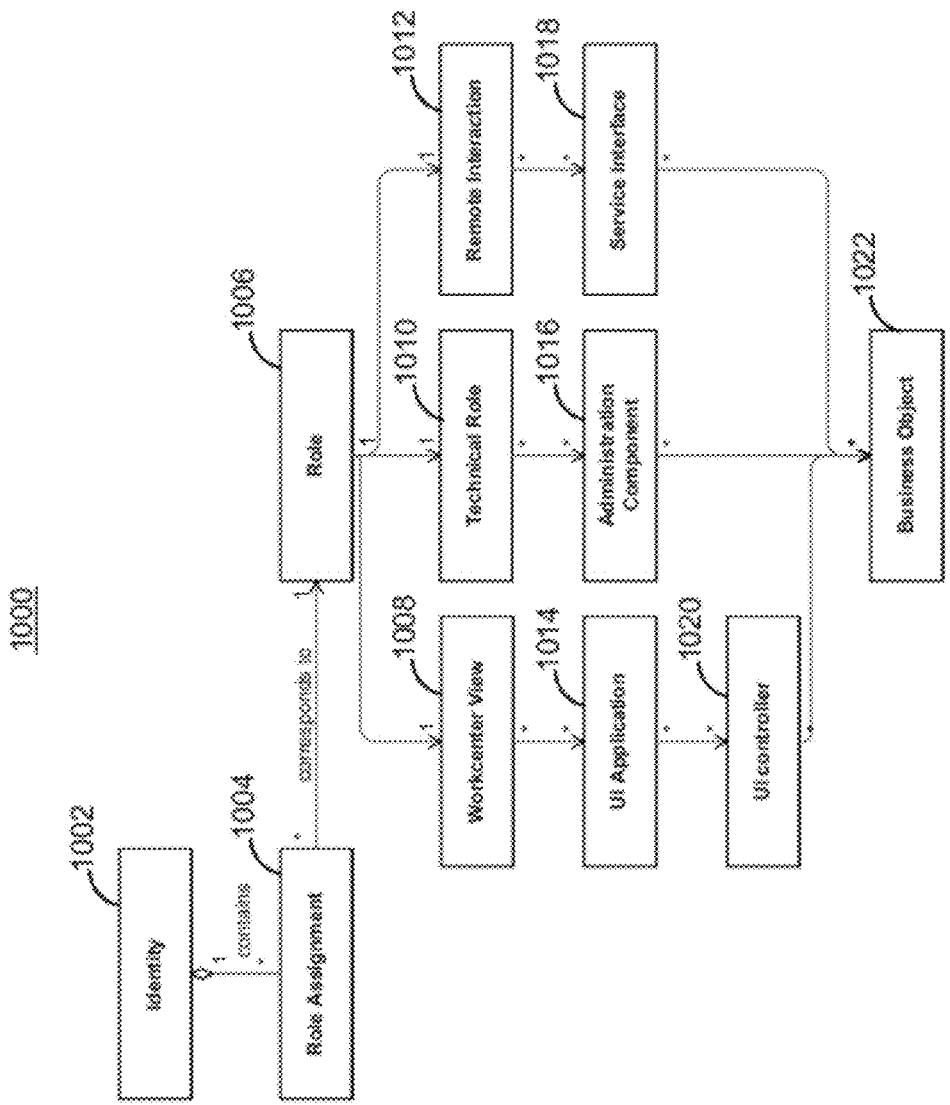
FIG. 10 illustrates a relationship between a role object and related objects according to an exemplary embodiment of the present invention.

FIG. 10 illustrates a relationship between a role object and related objects according to an exemplary embodiment of the present invention. Role represents any assignable object. Frequently referred to as authorization profile or role, the means to assign authorizations to users may usually be a grouping of authorizations necessary to pass all the authorization enforcement points in order to perform a specific business function. As shown in FIG. 10, an identity 1002 may contain a plurality of assigned roles that each may be a role assignment 1004. Each role assignment 1004 may correspond to a role object 1006. The role object 1006 may be related to either one of a workcenter view 1008, technical role 1010, or remote interaction 1012. If the role object 1006 is related to the workcenter view 1008, it may be further defined or limited by the layers UI application 1014 and UI controller 1020 before it may reach the BO 1022. If the role object 1006 is related to the technical role 1010, it may be further defined or limited by the administration component 1016 before it may reach the BO 1022. If the role object 1006 is related to the remote interaction 1012, it may be further defined or limited by the layers service interface 1018 before it may reach the BO 1022.

In one embodiment, the role object 1006 may represent any assignable object out of a metadata repository. Thus, the respective usage links may be followed to access up to the used business objects. Further, for any existing role, the business data may be accessible directly or indirectly to a user being assigned the role and may be retrieved by evaluating the repository usage relationships.

Figure 11:
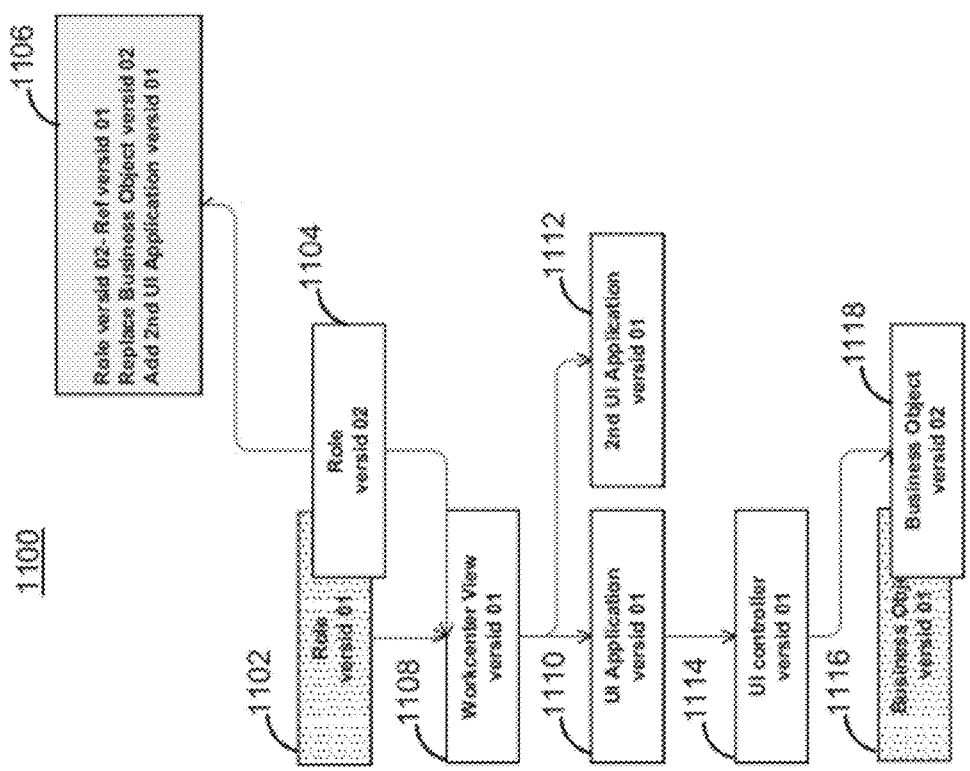
FIG. 11 illustrates a versioning control of a role object according to an exemplary embodiment of the present invention.

FIG. 11 illustrates a versioning control of a role object according to an exemplary embodiment of the present invention. Means to access the business data may be volatile. For example, protected resources, such as, but not limited to, forms, UIs and services, may tend to change much more frequently than the business data underneath. In one embodiment, the access relevant data may be treated similar to any other business data, because usage links between user and roles may be similar to the links among business objects in any metadata repository.

In one embodiment, once there is a user referencing (being assigned) a role, this role may be deactivated instead of being deleted. The old version may still be retrievable at any point in time. Changes to the role may be captured in a persistent form which carries a time stamp. FIG. 11 shows a role object 1102 with a version id 01 has been changed to a role object 1104 with a version id 02. The role object 1102 may be deactivated instead of being deleted. The changes to the role object may be persisted in a time stamped persistent document 1106, which may serve as a historical record of the changes. The analysis of the time stamped persistent documents may reveal the sequential changes done to the role, up the point in time required for the role analysis. There may be no changes to the workcenter view block 1108, UI application block 1110, and UI controller block 1114, and these blocks may still be active. Further, the $2^{nd}$ UI application block 1112 may be added and the accessed BO may have been changed from the BO 1116 with version id 01 to the BO 1118 with version id 02. The BO 1116 with version id 01 may also be deactivated similar to the deactivated role object 1102.

In one embodiment, this conservation process of persisting the changes may include, but is not limited to, the changes that may require adaptation of the user authorizations. The changes that may be relevant for the conservation process may include: changes in the user authorizations, changes in the relationship role to UI object, changes in the authorization relevant attributes of the involved objects, and changes in the usage relationship UI object to business object.

In one embodiment, for any given user and point in time, the exact business data that has been accessible to the user at that point in time may be retrieved. This may be achieved by leveraging the supplementary persistent information that may be collected on role changes and the usage relationship between the objects contained in a metadata repository. The authorizations assigned to the user in the form of a role may be translated down to the business relevant business objects, which may be the resources to be protected. The correspondence role-to-business object may be subject to changes over time. By analyzing the persisted changes and the usage relationships in the metadata repository, the role content may be retrieved for any point in time. Thus, in this embodiment, viewing authorizations as a technical commodity may be discontinued and authorizations may be subjected to the exigencies and regulations pertinent to business data. This may affect managing and capturing the changes over time, evaluating usage relationships to business data and providing the infrastructure for the required evaluation of authorization content.

Figure 12:
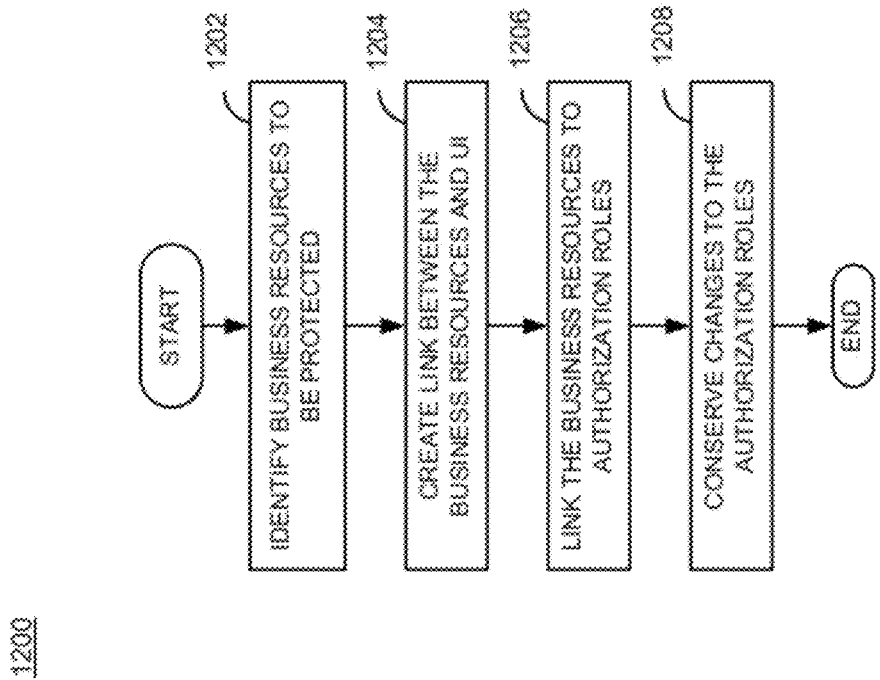
FIG. 12 illustrates a process for providing data for a pre-emptive security audit according to an exemplary embodiment of the present invention.

FIG. 12 illustrates a process 1200 for providing data for a pre-emptive security audit according to an exemplary embodiment of the present invention. At block 1202, business resources to be protected may be identified. At block 1204, link between the business resources and UI may be created. Layered access similar to the layered access model 800 as shown in FIG. 8 may be used to create links between the BO and UI. At block 1206, the business resources to authorization roles may be linked. For example, relationship between a role object and related objects may be defined as shown in FIG. 10. At block 1208, changes to the authorization roles may be persisted. The conservation process described above with respect to FIG. 11 may be used to record changes to roles and relationship between the role and UI objects. This conservation process may help security audits to identify programming needs, if necessary, corresponding to changes.

Embodiments of the present invention may provide data for pre-emptive security audits. The approach of the embodiments overcomes the problems associated with prior art solutions. For example, in the prior art solutions, analyzing user authorizations does not relate enough information in order to conclude about the possible access to protected business data. Further, providing access enforcement points at all levels of the application leads to users having more authorizations than they can possibly use—thus further obscuring the real capacities a user has for accessing the business data. Moreover, frequent changes in the authorization profiles and configurations of authorization enforcement points make a static or experimental translation between user authorizations and access business data impossible.

Embodiments of the present invention may comprise following technological components: a metadata repository as common repository of all business and application data; the modelling of all business resources as objects in the said repository, including the usage links between objects as modelled in the repository metadata; the role based access management as access enforcement agent and its plug-ins in the relevant frameworks as access enforcement points; the capacity of the access enforcement agent to accept access by trusted code in the so-called privileged mode, while keeping the information about the user attempting the access.

FIG. 13 illustrates a computer server 1300 according to an exemplary embodiment of the invention. The computer server 1300 may includes a processor 1302, memory 1304, and an I/O device(s) 1306. The processor 1302 is connected to the memory 1304 and I/O device(s) 1306. These connections are direct or via other internal electronic circuitry or components.

The processor 1302 is a programmable processor that executes instructions residing in the memory 1304 to receive and send data via the I/O device(s) 1306. The instructions may perform the operations of the application context and rule based UI control described herein. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention the processor 1302 may be an Intel® microprocessor.

Memory 1304 is a machine-readable medium that stores data that is processed by processor 1302. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 1302 via one or more I/O device(s) 1306.

The I/O device(s) 1306 may include one or more input/output devices (e.g., a touch screen, a network adapter) and interfaces that receive and/or send digital data to and from an external device. Interfaces as used herein are any point of access to an external device where digital data is received or sent, including ports, buffers, queues, subsets thereof, or any other interface to an external device.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A non-transitory computer-readable storage medium embodied with program instructions for causing a computer to execute a method for providing business data for a preemptive security audit, the method comprising:
   identifying a business resource to be protected;
   creating a link between the business resource and user interface (UI);
   linking the business resource to an authorization role, wherein the authorization role includes a group of authorizations required to perform a business function, each authorization providing access to authorization enforcement points at each level of a call stack;
   assigning a user to the authorization role;
   granting the user access to the business resource via at least one authorization enforcement point from the authorization enforcement points; and
   recording changes to the authorization role through version control by:
      persisting the authorization role as a previous version,
      creating a current version of the authorization role, and
      persisting the current version of the authorization role, wherein the current version of the authorization role is linked to the business resource and the previous version is deactivated.

2. The non-transitory computer-readable storage medium of claim 1, wherein authorization enforcement uses role based access management (RBAM).

3. The non-transitory computer-readable storage medium of claim 2, wherein controllers are used to facilitate access to heterogeneous data and preparing the data for UI output.

4. The non-transitory computer-readable storage medium of claim 2, wherein all UI and business related data are stored in a metadata repository.

5. The non-transitory computer-readable storage medium of claim 2, wherein authorization for access to the business resource has a user mode and privileged mode.

6. The non-transitory computer-readable storage medium of claim 5, wherein in the privileged mode, once an RBAM authorization check is passed successfully, all subsequent calls are granted.

7. The non-transitory computer-readable storage medium of claim 1, wherein old versions of the authorization role are deactivated and retrievable at any point in time, and changes to the authorization role are persisted in time-stamped persistent documents.

8. An apparatus for local process integration, comprising:
   a memory to store computer program instructions; and
   a processor configured to execute the computer program instructions to execute a method comprising:
      identifying a business resource to be protected;
      creating a link between the business resource and user interface (UI);
      linking the business resource to an authorization role, wherein the authorization role includes a group of authorizations required to perform a business function, each authorization providing access to authorization enforcement points at each level of a call stack;
      assigning a user to the authorization role;
      granting the user access to the business resource via at least one authorization enforcement point from the authorization enforcement points; and
      recording changes to the authorization role through version control by:
         persisting the authorization role as a previous version,
         creating a current version of the authorization role, and
         persisting the current version of the authorization role, wherein the current version of the authorization role is linked to the business resource and the previous version is deactivated.

9. The apparatus of claim 8, wherein authorization enforcement uses role based access management (RBAM).

10. The apparatus of claim 9, wherein controllers are used to facilitate access to heterogeneous data and preparing the data for UI output.

11. The apparatus of claim 9, wherein all UI and business related data are stored in a metadata repository.

12. The apparatus of claim 9, wherein authorization for access to the business resource has a user mode and privileged mode.

13. The apparatus of claim 12, wherein in the privileged mode, once an RBAM authorization check is passed successfully, all subsequent calls are granted.

14. The apparatus of claim 8, wherein old versions of the authorization role are deactivated and retrievable at any point in time, and changes to the authorization role are persisted in time-stamped persistent documents.

15. A computer implemented method for local process integration, the method comprising:
   identifying a business resource to be protected;
   creating a link between the business resource and user interface (UI);
   linking the business resource to an authorization role, wherein the authorization role includes a group of authorizations required to perform a business function, each authorization providing access to authorization enforcement points at each level of a call stack;
   assigning a user to the authorization role;
   granting the user access to the business resource via at least one authorization enforcement point from the authorization enforcement points; and
   recording changes to the authorization role through version control by:
      persisting the authorization role as a previous version,
      creating a current version of the authorization role, and
      persisting the current version of the authorization role,
         wherein the current version of the authorization role is linked to the business resource and the previous version is deactivated.

16. The computer implemented method of claim 15, wherein authorization enforcement uses role based access management (RBAM).

17. The computer implemented method of claim 16, wherein controllers are used to facilitate access to heterogeneous data and preparing the data for UI output.

18. The computer implemented method of claim 16, wherein all UI and business related data are stored in a metadata repository.

19. The computer implemented method of claim 16, wherein authorization for access to the business resource has a user mode and privileged mode.

20. The computer implemented method of claim 19, wherein in the privileged mode, once an RBAM authorization check is passed successfully, all subsequent calls are granted.

21. The computer implemented method of claim 15, wherein old versions of the authorization role are deactivated and retrievable at any point in time, and changes to the authorization role are persisted in time-stamped persistent documents.

22. A non-transitory computer-readable storage medium embodied with program instructions for causing a computer to execute a method for providing business data for a preemptive security audit, the method comprising:
   identifying a business resource to be protected;
   creating a link between the business resource and user interface (UI);
   linking the business resource to an authorization role, wherein the authorization role includes a group of authorizations required to perform a business function, each authorization providing access to authorization enforcement points at each level of a call stack;
   assigning a user to the authorization role;
   granting the user access to the business resource via at least one authorization enforcement point from the authorization enforcement points; and
   recording changes to the authorization role through version control by:
      persisting the authorization role as a previous version,
      creating a current version of the authorization role, and
      persisting the current version of the authorization role,
         wherein the current version of the authorization role is linked to the business resource and the previous version is deactivated;
   wherein all UI and business related data are stored in a metadata repository.

23. An apparatus for local process integration, comprising:
   a processor configured to execute the computer program instructions to execute a method comprising:
      identifying a business resource to be protected;
      creating a link between the business resource and user interface (UI);
      linking the business resource to an authorization role, wherein the authorization role includes a group of authorizations required to perform a business function, each authorization providing access to authorization enforcement points at each level of a call stack;
      assigning a user to the authorization role;
      granting the user access to the business resource via at least one authorization enforcement point from the authorization enforcement points; and
      recording changes to the authorization role through version control by:
         persisting the authorization role as a previous version,
         creating a current version of the authorization role, and
         persisting the current version of the authorization role, wherein the current version of the authorization role is linked to the business resource and the previous version is deactivated;
      wherein all UI and business related data are stored in a metadata repository.

24. A computer implemented method for local process integration, the method comprising:
   identifying a business resource to be protected;
   creating a link between the business resource and user interface (UI);
   linking the business resource to an authorization role, wherein the authorization role includes a group of authorizations required to perform a business function, each authorization providing access to authorization enforcement points at each level of a call stack;
   assigning a user to the authorization role;
   granting the user access to the business resource via at least one authorization enforcement point from the authorization enforcement points; and
   recording changes to the authorization role through version control by:
      persisting the authorization role as a previous version,
      creating a current version of the authorization role, and
      persisting the current version of the authorization role,
         wherein the current version of the authorization role is linked to the business resource and the previous version is deactivated;
   wherein all UI and business related data are stored in a metadata repository.

* * * * *